US009829584B1

(12) United States Patent
Darbon et al.

(10) Patent No.: US 9,829,584 B1
(45) Date of Patent: Nov. 28, 2017

(54) BISMUTH-CHARGED STRUCTURED SOLID ORGANIC SCINTILLATOR

(71) Applicant: Commissariat A L'Energie Atomique et Aux Energies Alternatives, Paris (FR)

(72) Inventors: Stéphane Darbon, Paris (FR); Matthieu Hamel, Cherbourg (FR); Adrien Rousseau, Etoillles (FR); Tony Caillaud, La Norville (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/538,599

(22) PCT Filed: Dec. 18, 2015

(86) PCT No.: PCT/FR2015/053629
§ 371 (c)(1),
(2) Date: Jun. 21, 2017

(87) PCT Pub. No.: WO2016/102845
PCT Pub. Date: Jun. 30, 2016

(30) Foreign Application Priority Data

Dec. 22, 2014 (FR) ..................... 14 63154

(51) Int. Cl.
*G01T 1/20* (2006.01)
(52) U.S. Cl.
CPC ............ *G01T 1/201* (2013.01); *G01T 1/2002* (2013.01)
(58) Field of Classification Search
CPC ......... G01T 1/201; G01T 1/2002; G01T 1/20; G01T 1/203; G01T 1/1644; G01T 3/06
See application file for complete search history.

(56) References Cited

U.S. PATENT DOCUMENTS

| 4,495,084 A | 1/1985 | Shimizu et al. |
| 4,788,436 A | 11/1988 | Koechner |

(Continued)

FOREIGN PATENT DOCUMENTS

| EP | 0913448 A1 | 6/2003 |
| FR | 2555321 A1 | 5/1985 |

(Continued)

OTHER PUBLICATIONS

Bigler, E., Ploack, F., Applied Optics, vol. 24, N°7, 994-997.

(Continued)

*Primary Examiner* — David Porta
*Assistant Examiner* — Faye Boosalis
(74) *Attorney, Agent, or Firm* — Brinks Gilson & Lione

(57) ABSTRACT

A scintillator for imaging using X-rays or gamma rays or charged particles, includes a network of glass capillaries with an inner diameter no greater than 500 micrometers. The capillaries are filled with a polymer material made up of at least (i) a monomer selected from the group comprising vinyltoluene, styrene and vinylxylene and the isomers thereof, (ii) a cross-linking agent made up of a divinylbenzene or a dimethacrylate having a central chain which includes 1 to 12 carbon atoms, and (iii) triphenylbismuth. The cross-linking agent is provided to make up 10 wt % to 60% wt of the mixture thereof with the monomer, and the triphenylbismuth makes up at least 5 wt %. The cross-linking agent is provided in a ratio of 0.75 to 2.25 times the weight content of the triphenylbismuth.

13 Claims, 2 Drawing Sheets

(56) References Cited

U.S. PATENT DOCUMENTS

| | | | |
|---|---|---|---|
| 7,238,951 B2 * | 7/2007 | Disdier | G01T 1/201 250/361 R |
| 7,372,041 B1 | 5/2008 | Nagarkar et al. | |
| 2011/0315885 A1 | 12/2011 | Cherepy et al. | |

FOREIGN PATENT DOCUMENTS

| | | |
|---|---|---|
| WO | WO2003/081279 A2 | 10/2003 |
| WO | WO2009/095376 A1 | 8/2009 |
| WO | WO2012/085004 A1 | 6/2012 |
| WO | WO2014/135640 A1 | 9/2014 |

OTHER PUBLICATIONS

Pichat, L., Pesteil, P., Clément, J. J., Chim. Phys. 1953, 50, 26-41.
M. Hamel, M., Turk, G., Rousseau, A., Darbon, S., Reverdin, C., Normand, S., Nucl. Instr. and Meth.A 660 (2011) 57-63.
Liang, Hao, et al., Spectrochim. Acta A 71 (2008) 588.
Riley, K. J.; Ovechkina, L.; Palamakumbura, S.; Bell, Z.; Miller, S.; Nagarkar, V. V. IEEE Nucl. Sci. Symp. Conf. Rec. 2010, 1777-1780.
Disdier, L., Lerche, R.A., Bourgade, J.L., Glebov, V.Yu., R.S.I. 75, 6, 2004.
C. Fourment et al., R.S.I. 80, 083505, 2009.
Lin, Q.; Yang, B.; Li, J.; Meng, X.; Shen, J. Polymer2000, 41, 8305-8309.
International Search Report of PCT Application No. PCT/FR2015/053628, dated Mar. 18, 2016, 5 pages.
International Search Report of PCT Application No. PCT/FR2015/053629, dated Mar. 8, 2016, 6 pages.

* cited by examiner

BISMUTH-CHARGED STRUCTURED SOLID ORGANIC SCINTILLATOR

TECHNICAL FIELD

The invention concerns a plastic (i.e. organic) bismuth-loaded, structured scintillator for imaging using X-rays or gamma rays or charged particles. It thus applies to the imaging using ionizing radiation be it X-, gamma-, beta-, protons, electrons or ions.

It finds uses in numerous fields such as non-destructive testing, medical imaging (radiography, gamma radiography, protonography, tomography) and security (radiographic inspection of packages for example). The invention may also be used in spectrometry to characterize the energy of ionizing radiation coming from a radiation source.

The scintillator is said to be structured in that the plastic material which it comprises is distributed within capillaries.

BACKGROUND

In the field of imaging, the role of the scintillator is to convert ionizing radiation into visible light radiation. To produce an imaging device of good quality, two opposing parameters must be optimized:

The detection threshold which imposes maximization of the scintillator thickness to increase the probability of interaction of the radiation with the scintillator and thus the light yield from conversion.

The spatial resolution which requires minimization of the scintillator thickness to limit the scattering of visible light since luminescence is an isotropic phenomenon.

Another parameter is the speed of scintillation decay; the lower it is, the better it enables rapid phenomena to be followed.

In practice, the material constituting a scintillator must be transparent, and emit as far as possible in the visible region, preferably above 500 nanometers (in fact, what is most important is for the scintillator to emit radiation that is compatible with a detector with which it may be required to be associated).

Two broad families of scintillators are known, according to whether the material of which they are constituted is inorganic or organic.

Within the field of ionizing radiation, the majority of commercial scintillators are mass single-piece inorganic crystals such as for example bismuth germanate (BGO) or cerium-doped yttrium aluminum garnet (YAG:Ce). As a result of their high density, these scintillators retain a relatively moderate thickness, while ensuring a high probability of interaction.

When it is sought to increase the sensitivity, it is necessary to turn to significant scintillator thicknesses. It is then necessary to use segmentation techniques in order to retain a satisfactory spatial resolution (the scintillator is known as "segmented" or "structured"). The scintillator is then constituted by a multitude of fibers, having for example a parallelepipedal cross section, the length of which is much greater than the other dimensions. These fibers are bonded together and optically isolated, oriented in such a way that the incident radiation arrives parallel to the largest dimension of the needles. In this case, the degradation of spatial resolution is limited because the light produced in each fiber cannot propagate into the adjacent fibers. Typically, the fibers have a length of the order of a centimeter and the other dimensions are at least several hundreds of micrometers.

However, this segmentation technique is extremely expensive and can only be applied to certain materials the crystal growth of which can be controlled.

Moreover, inorganic scintillators, due to their crystalline structure, have a response time that is too long for some applications. In fact, the response time of these materials in the great majority of cases greatly exceeds 10 ns, which is incompatible with some uses, in particular in diagnostics with fast laser X-ray imaging.

As regards organic scintillators, they have been used for a long time for ionizing radiation imaging. Reference may be made in particular to U.S. Pat. No. 4,495,084, (or the priority French Pat. No. FR 2 511 387), or to European Patent Application No. EP 0913448 or to PCT Application Publication No. WO 2014/135640. To the extent that the interception of the radiation often induces a scintillation at small wavelengths (outside the visible spectrum), it is known to incorporate molecules, called fluorophores, having the effect of converting the radiation resulting from the scintillation into radiation of longer wavelength, situated within the visible spectrum.

Nevertheless, with ionizing radiation, these organic scintillators have a lower probability of interaction than the inorganic scintillators, due to the low atomic number Z of the organic components. In order to overcome this difficulty, two broad techniques are used:

Filling a capillary matrix with the scintillation material, having the effect of reducing the light dispersion and allowing the use of large scintillator thicknesses, or Adding a high-Z material to the scintillation material in order to increase the density thereof.

Among the capillary scintillators there may be mentioned for example, filling a matrix of glass capillaries with a liquid scintillation material as described in PCT Application Publication No. WO 03/081279; these are for example capillaries the inner diameter of which is less than or equal to 50 micrometers, for example equal to 20 micrometers; with regard to the scintillation liquid, it contains a large fraction of deuterium. Nevertheless, its exploitation is difficult and complicated, because it is necessary to ensure that the liquid is confined, in particular under vacuum, which involves the use of a transparent confining material in order to allow the light to exit, which has the double drawback of increasing the number of optical interfaces (and consequently increasing the transmission losses, which is detrimental to the signal to be detected) and preventing any thermal expansion of the liquid scintillator (which increases the internal pressure in the capillaries and can lead to the destruction of the matrix).

Mention may also be made of filling a matrix of glass capillaries with a monomer and a neutron-absorbing material followed by a polymerization process; a first attempt was proposed in 1985 [E. Bigler, F. Ploack, Applied Optics, Vol. 24, No. 7, 994-997]; more recently it was proposed in U.S. Pat. No. 7,372,041 to fill capillaries of a plastic material or of glass having a diameter comprised between 10 and 200 micrometers with an organic polymer such as polystyrene or polyvinyltoluene, doped with a small percentage of Li, B, Sm, Cd, Eu, Gd or Dy, possibly also containing fluorophores. But this solution is limited to the detection of the neutrons and does not apply to ionizing radiation imaging.

It should be noted that the formation of a structured organic scintillator, comprising a network of small-diameter capillaries, involves in practice being able to form a homogeneous mixture in a mold in which pressure is reduced so as to force the mixture to penetrate into the capillaries by suction; these molds are therefore more complex than those in which monolithic scintillators are formed, which can be used at atmospheric pressure. It is understood that this penetration is made easier, the more homogeneous the viscosity, and the mixture, it being noted that it is advantageous to be able to make this mixture and to force its penetration into the capillaries at ambient temperature, and not in an enclosure at a controlled temperature above said ambient temperature. Next, polymerization of the mixture is induced, which is carried out in practice by increasing the temperature; it is self-evident that the operations of mixing and forced penetration of the mixture must not be carried out at a temperature at which polymerization of the mixture can take place.

The other option consisting of adding a high-Z material, such as lead, into an organic scintillator has been known since the 1950s [Pichat, L., Pesteil, P., Clément, J. J., Chim. Phys. 1953, 50, 26-41 and Lin, Q.; Yang, B.; Li, J.; Meng, X.; Shen, J. Polymer 2000, 41, 8305-8309]. This improves the interaction with the radiation and therefore the sensitivity of the scintillator. Nevertheless, high-Z materials can only be incorporated at low percentages and homogeneity of the mixture is very difficult to obtain, due to the precipitation phenomena observed with molecules containing heavy elements. More recently, some authors (M. Hamel, G. Turk, A. Rousseau, S. Darbon, C. Reverdin, S. Normand, Nucl. Instr. and Meth. A 660 (2011) 57-63 and PCT Application Publication No. WO 2012/085004 to M. Hamel, S. Darbon, S. Normand, and G. Turk) have shown that, by using an organometallic compound called lead dimethacrylate as a cross-linking agent of vinyltoluene, and methacrylic acid, it was possible to reach a high level of incorporation of the lead, ranging up to 12.3% (with 2-hydroxyethyl methacrylate instead of methacrylic acid, it was even possible to obtain 29%). An important aspect is that the lead atom is grafted directly onto the polymer chain, which ensures that a homogeneous distribution thereof is maintained as soon as the cross-linking begins, and avoids an accumulation by precipitation (PCT Application Publication No. WO 2012/085004 to M. Hamel, S. Darbon, S. Normand, and G. Turk). These authors add fluorophores to the scintillating organic material in order to shift the light emission to wavelengths suitable for the image sensor.

SUMMARY

It is understood that it would be beneficial to manage to combine the advantages of these two techniques within an organic scintillator, i.e. to combine the high density of the high-Z organic scintillators with the ability to have high thicknesses without detracting from the spatial resolution, all without needing to implement complex and expensive production steps.

It has been noted however that to date, the aforementioned two techniques appeared to be incompatible, in view of the difficulty in obtaining, at ambient temperature, homogeneous mixtures with heavy compounds such as lead compounds, which tend to precipitate to the bottom of the mold before it has been possible to initiate cross-linking; in other words forcing the mixture to penetrate into the capillaries while keeping the molecules loaded with lead in a regular distribution in this mixture has not been achieved.

In particular, attempts made to date to obtain an organic scintillator formed from a network of capillaries filled with a material loaded with a high-Z element have been unsuccessful, in particular due to the low solubility of lead dimethacrylate in the monomers suitable for the preparation of a capillary scintillator, which has the drawback of resulting in a precipitation in the lower part of the mold and even blocking of the capillaries.

However, to optimize the favorable effect of a high Z, it appeared advantageous to incorporate atoms of bismuth, slightly heavier than lead (Z=83, instead of Z=82).

The invention is directed to a structured organic scintillator with bismuth, the preparation of which can be carried out at ambient temperature, formed from capillaries filled homogeneously with a polymer material comprising a high bismuth fraction, while being transparent and advantageously having a sufficiently low scintillation decay time to permit ionizing radiation imaging (typically at most 20 ns).

To that end the invention provides a scintillator for imaging using X-rays or gamma-rays or charged particles, comprising a network of glass capillaries having an inner diameter at most equal to 500 micrometers, these capillaries being filled with a polymer material formed from at least (i) a monomer selected from the group constituted by vinyltoluene, styrene and vinylxylene and their isomers, (ii) a cross-linking agent constituted by a dimethacrylate having a central chain comprising from 1 to 12 carbon atoms or by divinylbenzene, and (iii) triphenylbismuth, the cross-linking agent being present in a percentage by weight from 10% to 60% of its mixture with the monomer and the triphenylbismuth being present at 5% by weight at least, the cross-linking agent being present in a proportion of 0.75 to 1.25 times the content by weight of triphenylbismuth.

It should be noted that this is a solid organic scintillator, heavily loaded with bismuth and incorporated into glass capillaries, formed from a mixture that can be prepared and incorporated inside capillaries at ambient temperature, while ensuring a good distribution of the bismuth in the cross-linked matrix.

An efficient way to bring the bismuth inside the organic material was to use triphenylbismuth.

It is noteworthy that it has already been known per se since the 1980s (see U.S. Pat. No. 4,495,084) to produce organic scintillators from vinyltoluene or styrene in combination with, in particular, alkyl methacrylates having from 1 to 4 carbon atoms; but it was not envisioned for such polymers to be loaded with a heavy element like bismuth and that they could be incorporated inside capillaries.

From European Patent Application No. EP0913448, compounds were also known containing various fluorophores in a polymer matrix of an aromatic monomer of styrene or vinyltoluene type and a divinylbenzene type agent; although it may have been mentioned that, from among a plurality of possible forms, the mixture could, prior to polymerization, be shaped within capillary tubes, that was a mere assertion, without the slightest justification and without the slightest taking into account of the difficulties inherent in the implementation of such capillaries; that document mentioned the use of metallic ions (of lanthanide type), inside chelates. Whatever the case, that document in no way envisioned incorporating bismuth into the organic material.

More recently polymers have been known, in particular according to the aforementioned PCT Application Publication No. WO 2012/085004, that are formed based on vinyltoluene, styrene, vinylxylene in combination with methacrylic acid and a cross-linking agent constituted by lead dimethacrylate; but it was not envisioned that such polymers could be incorporated inside capillaries. In fact, the mixtures with lead proposed by that document appeared not to be compatible with incorporation within a network of capillaries; indeed, the presence of methacrylic acid apparently had a very aggressive effect on the installation comprising the mold required to receive the mixture and the capillaries, in particular on the seals thereof. As regards the mixture of 2-hydroxyethyl methacrylate and lead dimethacrylate also mentioned in that document, although it does not contain methacrylic acid, it was apparently not suitable, due in particular to the precipitation phenomena observed with this lead dimethacrylate at ambient temperature.

Whatever the case, that document contains no specific teaching enabling what was indicated with regard to lead to be extrapolated to bismuth; on the contrary, the problems posed by the molecule carrying the lead tended to convince the person skilled in the art that problems of the same nature would arise with bismuth.

Even more recently, plastic scintillation materials are known from PCT Application Publication No. WO 2014/135640 that are formed from styrene, vinyltoluene or vinylxylene (or their isomers) in combination with a cross-linking agent such as divinylbenzene or, to promote rapid and complete cross-linking, 1,4 butanediyl dimethacrylate (recommended because it has a low shrinkage factor), which is a dimethacrylate having a central chain with 4 carbon atoms, and fluorophores. Nevertheless, this document did not envision the incorporation of bismuth-based organometallic compounds (at most it envisioned doping the polymer with boron), nor, a fortiori, the difficulties that could arise when utilizing the polymer material within a network of capillaries. It is noteworthy that this document is positioned within a different context to that of the invention, since it involves in particular enabling the production of scintillators in large volumes (structuring by means of capillaries does not then seem useful), with a view to the ability to distinguish between neutrons and gamma rays, by means of the utilization of boron which, with its low Z, is an opposite choice to that of bismuth.

Contrary to what might be assumed a priori with respect to the choice of a dimethacrylate having a central chain comprising between 1 and 12 carbon atoms, the latter appeared not to give rise to a problem of solubility in the mixture (contrary to what may have been noted with other dimethacrylates); in fact, not only did it not give rise to a problem of solubility per se, but moreover, it seems to have had a favorable effect on the solubilization of triphenylbismuth in the mixture, hence obtaining, after cross-linking, a regular distribution of the bismuth in the mixture inside the capillaries, even when their diameter is at most equal to 100 or even 50 micrometers, or even at most equal to 20 micrometers (or even 10 micrometers). After cross-linking, the matrix of the scintillator comprises a polymer inside the capillaries in which the bismuth remains with a substantially even distribution, even though that element is not fixed, without significant degradation over time.

Advantageously, the cross-linking agent is divinylbenzene.

When a dimethacrylate is chosen having a central chain comprising between 1 and 12 carbon atoms, it is advantageous to employ 1,4 butanediyl dimethacrylate. In a variant, this may be 1,2 ethylene glycidyl dimethacrylate, or 1,6 hexanediyl dimethacrylate, in particular.

Advantageously, the material comprises the monomer and the cross-linking agent in quantities by weight the ratio of which is comprised between 2 and 4. Preferably, this ratio is comprised between 2.9 and 3.1.

Also advantageously, the cross-linking agent and the triphenylbismuth are in quantities by weight the ratio of which is comprised between 0.9 and 1.1.

Advantageously, the material of the scintillator comprises the element Bi at at least 8% by weight (or even 10% by weight), which contributes a significant high-Z effect.

Advantageously, the material also comprises at least one fluorophore capable of generating light within the visible spectrum; this can be primary, secondary or tertiary fluorophores according to the usual nomenclature.

The principle of incorporating fluorophores into an organic scintillator is known per se, in particular according to PCT Application Publication No. WO 2012/085004 in which it is proposed to incorporate high-Z chemical elements in combination with compounds suitable for raising the emission wavelength above 550 nm, in one or more reactions, i.e. there can be a first fluorophore (primary fluorophore) that reacts to UV radiation by emitting photons in the red region, and a second fluorophore (secondary fluorophore) that reacts to these photons by emitting a visible light of a higher wavelength, or even a third fluorophore (tertiary fluorophore) that reacts to this visible light by emitting above the aforementioned threshold. Useful results were obtained with a 1,8-naphthalimide compound and bis-N-(2,5-di-t-butylphenyl)-3,4,9,10-perylenetetracarbodi-imide. European Patent Application No. EP 0913448 and PCT Application Publication No. WO 2014/135640 may also be mentioned; however, it is not envisioned to incorporate such a mixture, comprising such fluorophores, into capillaries.

From a structural point of view, the scintillator of the invention advantageously has a face intended to be placed opposite an X- or gamma- or charged-particle ray, which is provided with a reflective coating suitable for sending light towards the other face.

According to another advantageous option, a face intended to be placed opposite an X- or gamma- or charged-particle ray is provided with a light-scattering coating suitable for sending light towards the other face.

Advantageously, the capillaries are coated internally with a reflective material.

The inner diameter of the capillaries is advantageously at most equal to 100, or even 50 micrometers, or preferably 20 micrometers, or even 10 micrometers, which makes it possible to obtain a very good spatial resolution.

BRIEF DESCRIPTION OF THE DRAWING

Objects of the invention will become apparent from the following description, given by way of non-limitative illustrative example, in the light of the attached drawing in which.

DETAILED DESCRIPTION

Figure 1:
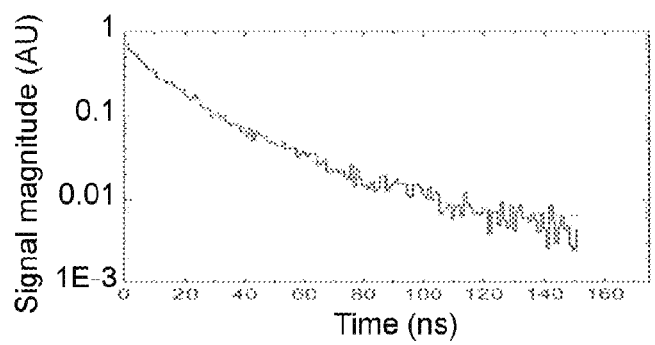
FIG. 1 is a graph representing the decay (in arbitrary units) of the signal emitted against time for a scintillator in accordance with the invention.

In general, the invention consists of producing structured organic scintillators from a mixture comprising at least one monomer selected from the following monomers (including their isomers):
Vinyltoluene
Styrene
Vinylxylene
to which is added at least one cross-linking agent chosen from the group constituted by divinylbenzene and dimethacrylates having a central chain comprising 1 to 12 carbon atoms (such as 1,4 butanediyl dimethacrylate), while respecting the condition that the proportions of cross-linking agent and of monomer are comprised between 10%-60% and 90%-40%, with respect to the mixture of monomers and of constituents. This means that there may be from 10% to 60% of cross-linking agent, with respect to the mixture of monomers and of cross-linking agent.

After adding an appropriate proportion of triphenylbismuth (in practice at least equal to 5% by weight of the mixture of monomer and cross-linking agent and triphenylbismuth), an organic scintillator is obtained that combines the advantages of a capillary scintillator and a high-Z scintillator: in fact, this scintillator combines a good spatial resolution and a good sensitivity, without involving a significant thickness, and without the risk of deterioration of the transparency over time.

The content of cross-linking agent is advantageously selected as a function of the triphenylbismuth content, in practice between 0.75 and 2.25 times this content, preferably between 0.9 and 1.1 times this content, which amounts to saying that, preferably, the content of cross-linking agent is at least approximately equal to the triphenylbismuth content.

A scintillator of the aforementioned type has an intrinsic light emission in the UV when it is subjected to an ionizing radiation. This is why one option of the invention consists of incorporating fluorophores into the organic material of the scintillator in order to convert the preferential emission in the UV thereof to the red region. This makes it possible to adapt the scintillator to the image sensors such as CCD sensors for example.

The fluorophores used in the invention are preferably derivatives of 1,8-naphthalimide.

Without wishing to be limited thereto, it is noteworthy that particularly useful results have been obtained by using two primary fluorophores, 2,5-diphenyloxazole or biphenyl.

Very particularly advantageously, the invention utilizes another fluorophore which is either a compound with a structure close to the naphthalimides (bis-N-(2,5-di-t-butylphenyl)-3,4,9,10-perylenetetracarbodiimide), or Nile Red.

Other fluorophores can be envisioned provided that the energy transfers are carried out from the near UV to the red region with a good quantum efficiency, determined by the overlapping of the successive emission/absorption spectra.

It is noteworthy that the set of fluorophores provided above make it possible to retain a decay time of the order of approximately ten nanoseconds.

Thus, the invention makes it possible to develop plastic scintillators the wavelength of which is easily adjustable. In other words, it is possible according to the invention to add up to three or even four different fluorophores, which convert the incident radiant energy from the UV to the red region.

To this end it is possible to select:
A first fluorophore (primary fluorophore) that is soluble in the apolar solvents at concentrations comprised between 0.5 and 15% by weight, preferably between 3% and 15% by weight, having a maximum absorption wavelength close to 300 nm and emitting light at around 360 nm, having a quantum efficiency of fluorescence greater than 20% and a luminescence decay constant less than 20 ns;
A second fluorophore (secondary fluorophore) that is soluble in the apolar solvents at concentrations comprised between 0.01 and 4% by weight, having a maximum absorption wavelength close to 360 nm and emitting light at around 420 nm, having a quantum efficiency of fluorescence greater than 40% and a luminescence decay constant less than 20 ns;
A third fluorophore (tertiary fluorophore) that is soluble in the apolar solvents at concentrations comprised between 0.01 and 1% by weight, having a maximum absorption wavelength close to 420 nm and emitting light at around 510 nm, having a quantum efficiency of fluorescence greater than 40% and a luminescence decay constant less than 20 ns;
A fourth fluorophore (quaternary fluorophore) that is soluble in the apolar solvents at concentrations comprised between 0.01 and 1% by weight, having a maximum absorption wavelength close to 510 nm and emitting light at around 590 nm, having a quantum efficiency of fluorescence greater than 40% and a luminescence decay constant less than 20 ns.

FIG. 1 represents a time-resolved measurement of the spectrum for an excitation of the scintillator at 330 nm, expressing a measurement of the decay time of the scintillator. The decay profile over time at the wavelength of interest is measured then approximated by a single or double decreasing exponential function. The decay time is then defined as the time constant of the first exponential function.

The capillary matrix utilized in the invention is made from glass, in practice according to a staggered arrangement, with optional spacers between the capillaries. The utilization of capillaries made from plastic material cannot be envisioned because in the vast majority of cases the glass transition temperature is below 100° C. or very slightly above (with the notable exception of the family of polycarbonates). As the polymerization of the heavy-metal loaded scintillators passes through thermal cycles exceeding 100° C., the integrity of the assembly cannot then be ensured.

The optical index of the heavy-metal loaded organic scintillator is close to 1.57. The index of the glass constituting the cladding must therefore be less than this value in order to ensure guiding according to Snell-Descartes law. As scintillation is intrinsically isotropic, the waveguide thus constituted must have a numerical aperture (the formula of which is provided below) that is as high as possible in order to reduce unguided light losses. To this end, the index of the glass constituting the cladding must be well below that of the index of the scintillating plastic.

$$NA = \sqrt{n_c^2 - n_{cl}^2} \text{ with} \begin{cases} n_c \text{ core index} \\ n_{cl} \text{ cladding index} \end{cases}$$

Figure 2A:
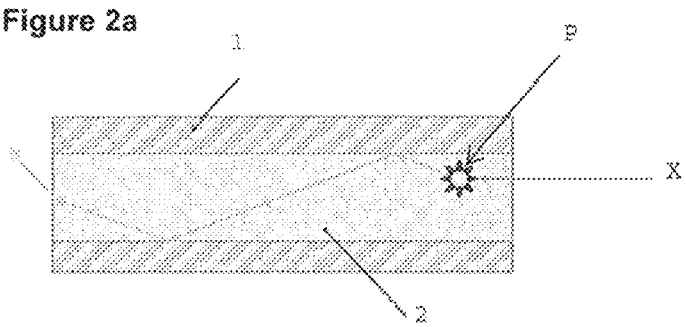
FIG. 2a is a diagram of a bare capillary

FIG. 2a shows a capillary comprising a glass tube 1 (the index n is substantially equal to 1.47) and a polymerized material 2 (in the case in question, its index n was 1.57); an X-ray coming from the right is intercepted there within the material, at a site denoted by the arrow P, so as to generate a photon flowing towards the left, while being reflected off the inner surface of the capillary.

Figure 2B:
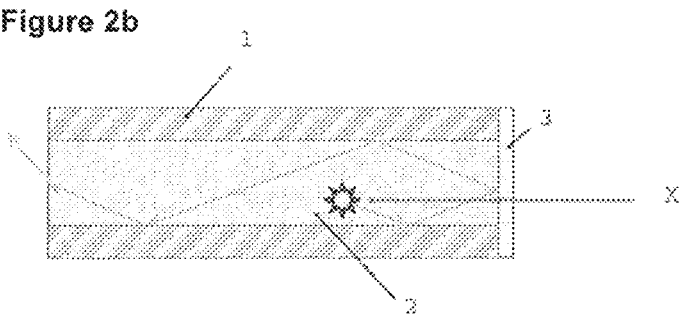
FIG. 2b is a diagram of a capillary provided with a reflective coating on the rear face

According to an advantageous feature of the invention, a reflective layer 3 is added on the face of the scintillator which, being perpendicular to the capillary matrix, is in direct view of the ionizing radiation; this makes it possible to recover the light propagating in the opposite direction to the X-ray (see FIG. 2b, in comparison with the basic configuration in FIG. 2a).

According to another advantageous feature of the invention, between the capillaries or along their inner surface a material (not shown) is added, absorbing the visible light in order to reduce the cross-talk between waveguides. As the scintillation is isotropic, while the waveguide constituted by the scintillating core and the glass cladding has a limited acceptance angle, the addition of the absorbent also reduces unguided stray light, thereby improving the spatial resolution.

Figure 2C:
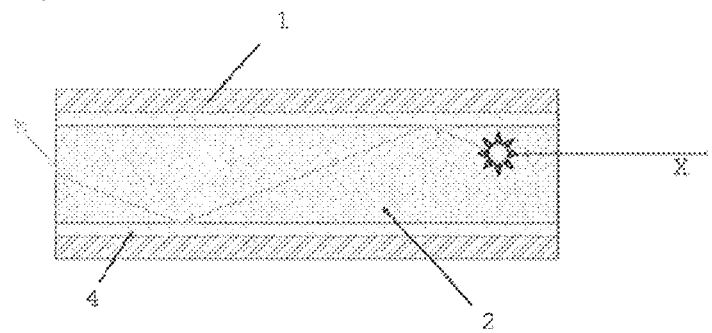
FIG. 2c is a diagram of a capillary the inner surface of which comprises a reflective coating
Figure 2D:
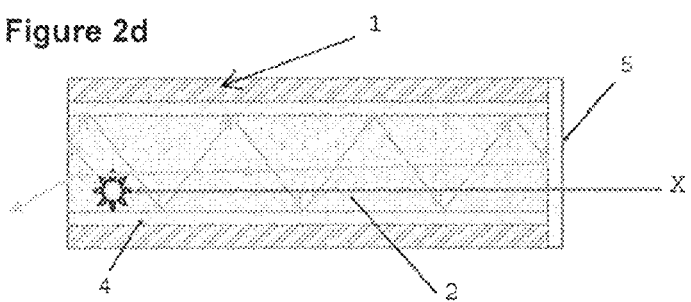
FIG. 2d is a diagram of a capillary combining a reflective coating on the inner wall and a reflective or light-scattering coating on the rear face.

According to yet another variant, a reflective metallic deposit 4 is formed on the inner walls of the glass capillaries (see FIG. 2c). In fact, while the previous versions lose over 50% of the light signal due to the limited acceptance angle of the step-index waveguide, the addition of the reflective deposit allows the light generated by the scintillator to be guided with a minimum of loss. Nevertheless, due to the scintillator/air interface, a portion of the guided light remains trapped inside the waveguide. In order to recover this light, the inventors provide, moreover, to add a mirror 3 or a light-scattering coating 5 on the rear face of the capillary matrix (see FIG. 2d).

Figure 3A:
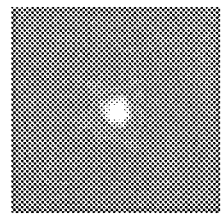
FIGS. 3a to 3c are figures showing illuminance corresponding to the capillaries of FIGS. 2a to 2c.
Figure 3B:
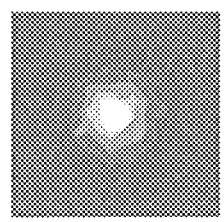
Figure 3C:
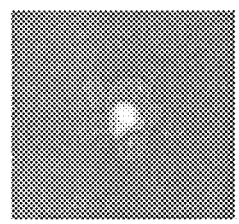
Figure 3D:
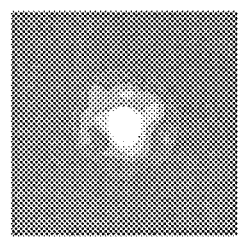
FIG. 3d is a figure showing illuminance corresponding to the case of a capillary according to FIG. 2d with a reflective coating.
Figure 3E:
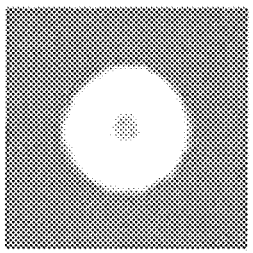
FIG. 3e is a figure showing illuminance corresponding to the case of a capillary according to FIG. 2d with a light-scattering coating.

The benefit of the aforementioned additions is apparent from comparison of FIGS. 3a to 3e:

FIG. 3a shows the illumination map obtained for a waveguide formed from a bare capillary, for a 1 W isotropic point source in the middle of the guide, with a linear color scale from 0 to 7.7 $10^6$ W/m$^2$ (the measured loss was 89%), FIG. 3b shows the illumination map obtained under the same conditions, in the case of a capillary equipped with a mirror on the rear face (FIG. 2b); the measured loss was 76%, FIG. 3c shows the illumination map obtained under the same conditions, in the case of a capillary the inner surface of which is made reflective (FIG. 2c); the measured loss was 88%, FIG. 3d shows the illumination map obtained under the same conditions, in the case of a capillary combining an inner reflective surface and a mirror on the rear face (FIG. 2d); the measured loss was 76%, and FIG. 3e shows the illumination map obtained under the same conditions, in the case of a capillary combining an inner reflective surface and a light-scattering coating on the rear face (FIG. 2d); the measured loss was 14%.

It is noteworthy that, in comparison with the case of a bare capillary, the presence of a reflective coating on the inside of the capillary has practically no effect (it seems that, in the case in question, the inner surface of the capillary already had a significant reflective effect). The presence of a mirror on the rear face has a positive effect; on the other hand, surprisingly, the losses are significantly reduced by placing a scatter material on the rear face.

By way of example, an organic scintillator is produced from a poly(styrene)-poly(1,4-butanediyle dimethacrylate) mixture placed in the presence of a determined proportion of triphenylbismuth; the glass used for the glass capillaries (reference 8250 from the manufacturer Schott) has an optical index of 1.57. The numerical aperture of the bundle of scintillating fibers then creates a numerical aperture of 0.52 corresponding to an angle of 31.6°. The glass capillaries have an inner diameter of at most 100 μm, or even less than 50 μm, or even at most equal to 20 or even 10 μm In order to avoid too large an inhomogeneity of illumination of the scintillator, a strict control of the thickness of the glass (difference between outer/inner diameter) and of the glass index was carried out. In fact, a wide divergence of this thickness leads to significant fluctuations in density and index between capillaries.

Fluorophores are incorporated in order to maximize the fluorescence intensity under X-rays. The best scintillation yields were obtained for weight percentages of bismuth close to 10%.

A particular example of composition is given below, in a ratio of 8% Pb:

| | |
|---|---|
| % by weight of styrene | 60 |
| % by weight of 1,4 butanediyl dimethacrylate | 20 |
| % by weight of triphenylbismuth | 20 |
| % by weight of bismuth | 8.18 |
| % by weight of PPO | 15 |
| % by weight of N-(2',5'-di-t-butylphenyl)-4-butylamino-1,8-naphthalimide | 0.3 |
| % by weight of bis-N-(2',5'-di-t-butylphenyl)-3,4,9,10-perylenetetracarbodiimide | 0.02 |
| λ absorption (nm) | <500 |
| λ max fluorescence (nm) | 580 |
| Decay time (ns) | 6 |

The contents are given with reference to the mixture of the first three constituents; the monomer and the cross-linking agent are present here in a weight ratio of 2/1, while the cross-linking agent has a content by weight equal to that of the triphenylbismuth.

Similar proportions can be utilized for a mixture of vinyltoluene (or of vinylxylene) with 1,4 butanediyl dimethacrylate (or another dimethacrylate having a central chain comprising from 1 to 12 carbon atoms), or with divinylbenzene as cross-linking agent, while achieving satisfactory results.

Preferably, the scintillator of the invention has a maximum emission towards wavelengths above 570 nm. By way of example, the fluorescent compounds incorporated into the scintillators studied are derivatives of 1,8-naphthalimides, perylene carbodiimides and Nile Red.

In a simplified version of the invention, it is possible to prepare scintillators fluorescing in any visible wavelength range whatsoever.

By way of example, in order to produce a bismuth scintillator defined above, pure 1,4 butanediyl dimethacrylate, pure styrene, triphenylbismuth, N-(2',5'-di-t-butylphenyl)-4-butylamino-1,8-naphthalimide, bis-N-(2',5'-di-t-butylphenyl)-3,4,9,10-perylenetetracarbodiimide and 2,5-diphenyloxazole are mixed under inert atmosphere in a dry flask. The mixture is fully degassed using the method known as "freeze-pump-thaw", then it is poured carefully into a mold having the dimensions of the capillary matrix, which will give the final form of the scintillator.

The capillary matrix, the inner diameter of which is a few tens of micrometers (at most 20, or even 10 micrometers), is then introduced into the mold so that the liquid forcibly enters the spaces left free in the glass matrix over a length of several centimeters.

The preparation of the mixture, its introduction into the mold, then the introduction of the capillary matrix are carried out at ambient temperature, a temperature at which good solubilization of the various constituents of the mixture is ensured.

After a heat cycle adapted to putting the scintillator into form and allowing all the monomers to polymerize, the product is removed from the mold, then polished until a surface condition is obtained that is compatible with imaging applications. The dimensions of the scintillator are, for example, 40 mm in length and width (perpendicularly to the length of the capillaries) and 5 mm thick (parallel to these capillaries). The main emission wavelength is 580 nm.

The invention claimed is:

1. A scintillator for imaging using X-rays or gamma-rays or charged particles, comprising:
   a network of glass capillaries having an inner diameter at most equal to 500 micrometers, the capillaries filled with a polymer material comprising at least,
   (i) a monomer selected from the group constituted by vinyltoluene, styrene and vinylxylene and their isomers,
   (ii) a cross-linking agent constituted by a dimethacrylate having a central chain comprising from 1 to 12 carbon atoms or by divinylbenzene, and
   (iii) triphenylbismuth,
   wherein the polymer material includes 10 wt. % to 60 wt. % cross-linking agent in combination with the monomer, and at least 5 wt. % triphenylbismuth, and a proportion of the cross-linking agent is 0.75 to 1.25 times the weight of triphenylbismuth.

2. The scintillator according to claim 1, wherein the cross-linking agent is divinylbenzene.

3. The scintillator according to claim 1, wherein the cross-linking agent is 1,4 butanediyl dimethacrylate.

4. The scintillator according to claim 1, wherein the polymer material comprises the monomer and the cross-linking agent in a weight ratio of between 2 and 4.

5. The scintillator according to claim 4, wherein the monomer and the cross-linking agent are in a weight ratio of between 2.9 and 3.1.

6. The scintillator according to claim 1, wherein the cross-linking agent and the triphenylbismuth are in a weight ratio of between 0.9 and 1.1.

7. The scintillator according to claim 1, wherein the polymer material further comprises at least 8 wt. % Bi.

8. The scintillator according to claim 1, wherein the polymer material further comprises at least one fluorophore capable of generating light in the visible spectrum.

9. The scintillator according to claim 1, wherein a face of the scintillator opposite an X-ray or gamma-ray or charged-particle ray includes a reflective coating suitable for reflecting light towards the other face.

10. The scintillator according to claim 9, wherein the capillaries include an internal coating of a reflective material.

11. The scintillator according to claim 1, wherein a face of the scintillator opposite an X-ray or gamma-ray or charged-particle ray includes a scattering coating suitable for sending light towards the other face.

12. The scintillator according to claim 11, wherein the capillaries include an internal coating of a reflective material.

13. The scintillator according to claim 1, wherein the capillaries have an inner diameter no more than 20 micrometers.

* * * * *

UNITED STATES PATENT AND TRADEMARK OFFICE
CERTIFICATE OF CORRECTION

| | | |
|---|---|---|
| PATENT NO. | : 9,829,584 B1 | Page 1 of 1 |
| APPLICATION NO. | : 15/538599 | |
| DATED | : November 28, 2017 | |
| INVENTOR(S) | : Stéphane Darbon et al. | |

It is certified that error appears in the above-identified patent and that said Letters Patent is hereby corrected as shown below:

On the Title Page

Left column, insert a new item as follows:
--Prior Publication Data
(65) US 2017/0343681 A1 November 30, 2017--.

Signed and Sealed this
Sixth Day of February, 2018

Joseph Matal
*Performing the Functions and Duties of the
Under Secretary of Commerce for Intellectual Property and
Director of the United States Patent and Trademark Office*